United States Patent [19]

Brännström

[11] Patent Number: 4,913,068
[45] Date of Patent: Apr. 3, 1990

[54] METHOD FOR IMPROVING UTILIZATION OF SULPHUR-ABSORBENT CONTAINING CALCIUM IN A POWER PLANT AND EQUIPMENT FOR PERFORMING THE METHOD

[75] Inventor: Roine Brännström, Finspong, Sweden

[73] Assignee: ABB Stal AB, Sweden

[21] Appl. No.: 250,006

[22] Filed: Sep. 27, 1988

[30] Foreign Application Priority Data

Sep. 30, 1987 [SE] Sweden .............................. 87037636

[51] Int. Cl.⁴ .............................................. F23B 7/00
[52] U.S. Cl. ..................................... 110/342; 110/224; 110/245; 110/345; 110/347; 44/604
[58] Field of Search ............... 110/342, 343, 344, 345, 110/347, 224, 245; 44/604

[56] References Cited

U.S. PATENT DOCUMENTS

| | | | |
|---|---|---|---|
| 4,312,280 | 1/1982 | Shearer et al. | 110/342 X |
| 4,397,248 | 8/1983 | Mehta et al. | 110/342 X |
| 4,640,205 | 2/1987 | Brannstrom | 110/347 |
| 4,752,302 | 6/1988 | Bowers et al. | 110/342 X |

FOREIGN PATENT DOCUMENTS

| | | |
|---|---|---|
| 3234315 | 9/1982 | Fed. Rep. of Germany . |
| 8502453 | 11/1984 | PCT Int'l Appl. . |
| 453262 | 5/1987 | Sweden . |

*Primary Examiner*—Edward G. Favors
*Attorney, Agent, or Firm*—Pollock, Vande Sande & Priddy

[57] ABSTRACT

A method for improving utilization of sulphur-absorbent containing calcium, in a power plant burning fuel in a fluidized bed (12) of particulate material in a combustion chamber (11). When fresh absorbent is prepared it is crushed and the crushed material is subsequently divided into a fine and a coarse fraction. The fine fraction is calcinated, mixed with crushed coal (41) and used as drying agent. The invention also relates to a power plant having equipment (28) for calcinating a fine-particled fraction of fresh sulphur-absorbent, and also equipment for mixing coal (41) and the calcinated absorbent and equipment (46, 48) for feeding the mixture of absorbent and coal into the bed. (FIG. 3).

16 Claims, 2 Drawing Sheets

METHOD FOR IMPROVING UTILIZATION OF SULPHUR-ABSORBENT CONTAINING CALCIUM IN A POWER PLANT AND EQUIPMENT FOR PERFORMING THE METHOD

TECHNICAL FIELD

The present invention relates to a method for improving the utilization of sulphur-absorbent containing calcium, in a power plant burning fuel in a fluidized bed containing particulate material consisting at least partially of sulphur-absorbent. The invention also relates to a power plant including equipment for calcinating sulphur-absorbent for performing the method.

BACKGROUND ART

When removing sulphur during combustion of liquid or solid fuel containing sulphur, large quantities of preferably limestone or dolomite are consumed, calcium being the substance utilized. An efficient way of removing sulphur is to allow combustion to take place in a fluidized bed consisting at least partially of lime or dolomite.

The cost of procuring absorbent material and disposing of consumed absorbent material substantially increases the costs involved in the production of heat and electricity. Disposal of the consumed material also entails environmental problems. It is thus important, both from the expense and the environmental aspects, that the absorbent material is thoroughly utilized, preferably to almost 100%.

In what is known as a bubbling, fluidized bed, the gas speed is generally between 0.5 and 2.0 m/sec, and the particulate material in the bed behaves more or less like a liquid. Particles smaller than a certain size accompany the combustion gases leaving the bed and they therefore remain in the bed for only a short while. The duration of stay is also affected to a certain extent by the shape of the particles. With a gas speed of 1 m/sec, particles smaller than about 0.3–0.5 mm are blown away from the bed so quickly that their absorption capacity cannot be satisfactorily utilized. This means that the fraction of absorbent crushed to a size smaller than 0.3–0.5 mm is poorly utilized since its duration of stay in the bed is so short.

DISCLOSURE OF THE INVENTION

According to the invention, when fresh absorbent is prepared it is crushed and divided into a coarse and a fine fraction. The coarse fraction is supplied directly to the bed in a combustion chamber, either separately or together with fuel. The fine fraction, on the other hand, is calcinated before being supplied to the bed, so that calcium oxide CaO is formed. This calcinated absorbent is mixed with fuel and then acts as drying agent for the fuel. The use of CaO as drying agent for fuel is known through Swedish patent 8403665-6, for instance.

Upon contact with fuel particles, the CaO combines with moisture in the fuel in accordance with the following formula:

$$CaO + H_2O \rightarrow Ca(OH)_2$$

The calcium hydroxide ($Ca(OH)_2$) formed in this reaction is a dry, fine-particled powder. When it is returned to the bed and heated, the reaction takes place in the opposite direction and fine-particled calcium oxide CaO is formed. The small particle size offers favorable reaction conditions and an extremely quick reaction is obtained with sulphur dioxide, $SO_2$. Supplying the mixture of fuel and the now extremely fine-particled absorbent, thus gives a very high utilization of the absorbent despite its short duration of stay in the bed.

DESCRIPTION OF THE DRAWINGS

The invention is described in more detail with reference to the accompanying drawings.

In FIG. 1, 1 designates an absorbent particle of limestone, $CaCO_3$. After a certain duration of stay in the bed its outer portion has absorbed sulphur and formed a layer 2 of hydrated calcium sulphate, $CaSO_4$.

Simplified, the following reactions have taken place $$CaCO_3 \xrightarrow{heat} CaO + CO_2$$

$$CaO + SO_2 + \tfrac{1}{2}O_2 \longrightarrow CaSO_4.$$

The core 3 of the particle may consist of $CaCO_3 + CaO$ and possibly other compounds in various proportions, dependent on the duration of stay in the bed, temperature of the bed, partial pressure of $CO_2$ and other factors. The distance between the surface 4 and the boundary layer 5, i.e. the thickness of the layer 2 of hydrated calcium sulphate affects the absorption propensity of the particle. The thicker the layer 2, the longer it takes for $SO_2$ to penetrate through it, with the result that the absorption ability of the particles deteriorates and the thickness of the layer 2 gradually increases more slowly.

Figure 1:
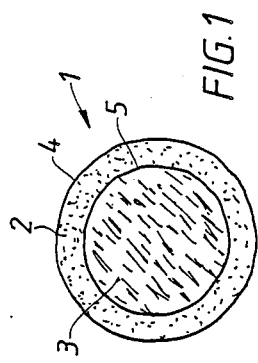
FIG. 1 illustrates a partially utilized absorbent particle.
Figure 2:
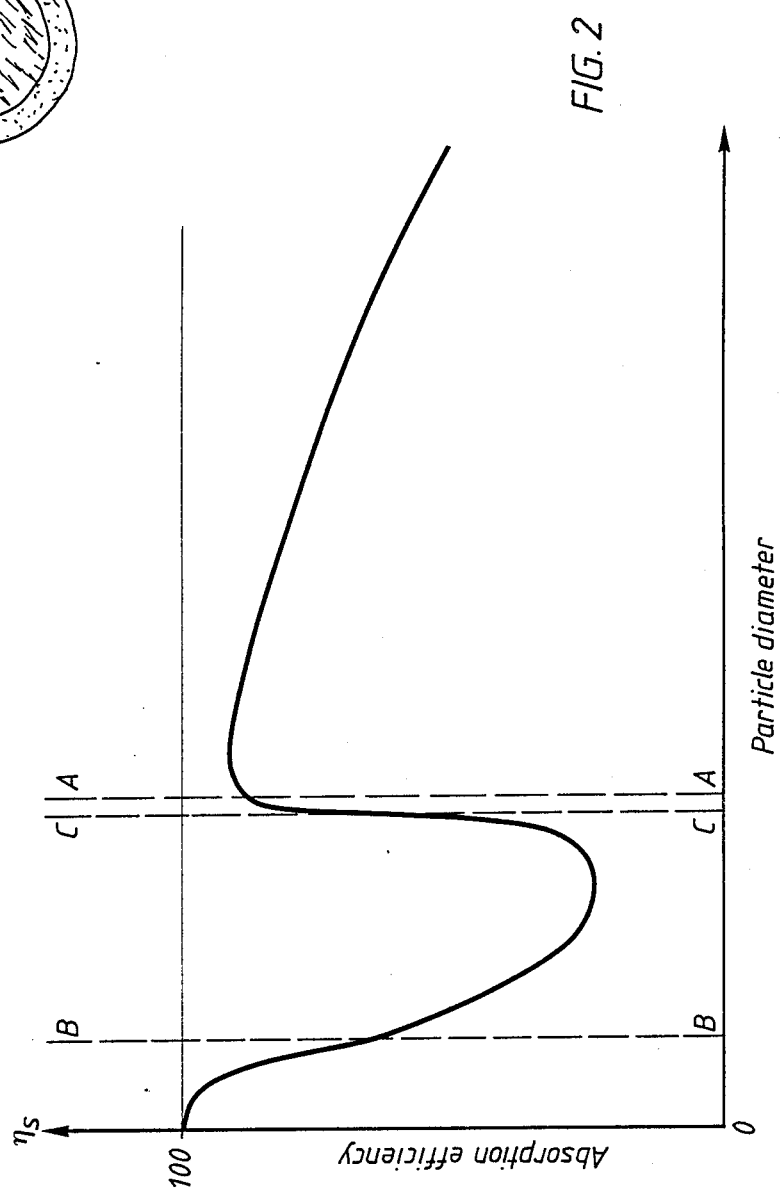
FIG. 2 the relation between particle size and absorption efficiency.

The above situation causes the efficiency of the absorbent to vary with the particle size as indicated by curve C in FIG. 2. Very small particles react almost instantaneously with $SO_2$ and are thus fully utilized before having time to leave the bed. With increasing particle size, the time required for the particle to be fully utilized increases. This means that some of the particles within the size range from the $\eta_s$ axis to the line A—A, which are carried away quickly with the combustion gases, will be incompletely utilized. The degree of utilization within the range B—B to C—C will be totally unsatisfactory. The location of A—A is dependent, inter alia, on the speed of the gas in the bed. With increasing gas speed, the line A—A will be shifted to the right. By sorting out particles below a certain size when preparing fresh bed material by crushing, said particles disappearing rapidly from the fluidized bed, and calcinating the fine-particled fraction sorted out, enables better utilization of this fraction. It can be mixed with moist fuel, thus drying at least the surface of the fuel particles, thus improving the transport properties of the fuel. The calcium oxide, CaO, formed at calcination is combined with moisture in the fuel, forming calcium hydroxide, $Ca(OH)_2$, and disintegrates into fine particles. The particles in the sorted fraction acquire a size making them efficient from the absorption aspect, despite the short duration of stay in the bed.

Figure 3:
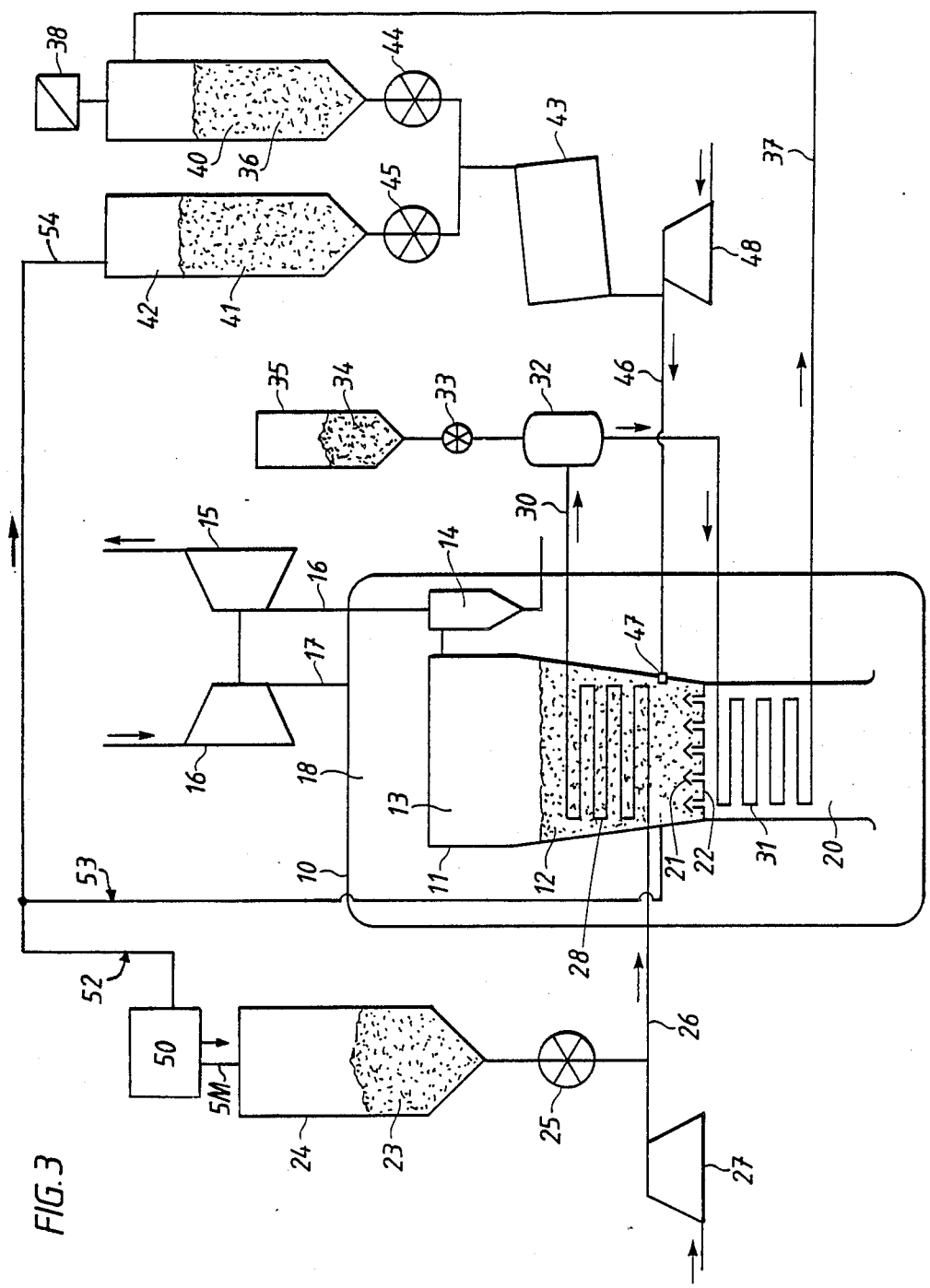
FIG. 3 shows a power plant with pressurized fluidized bed including equipment for calcinating the fine-particled absorbent fraction.

Calcination can be performed in a power plant with an atmospheric bed or a pressurized bed of the type shown in FIG. 3. In the figure, 10 designates a pressure vessel and 11 a combustion chamber with fluidized bed 12 where a fuel is burned. The combustion gases formed are collected in the free-board 13, cleaned in the cleaning plant symbolized by cyclone 14, and then supplied to the gas turbine 15. This turbine 15 drives a compressor 16 which compresses combustion air. The space 18 is supplied with this compressed combustion air via pipe 17. The combustion air is supplied to the combustion chamber 11 via shaft 20 and nozzles 21 in the combustion chamber bottom 22.

After crushing in crusher 50, the fine-particled fraction 23 of absorbent is supplied via conduit 51 to container 24 and from container 24 via cell feeder 25 to transport pipe 26. The heavy fraction is supplied from crusher 50 via conduit 52 to conduit 53 to the combustion chamber and/or conduit 54 to container 42. The absorbent is carried by transport air from compressor 27 through the pipe system 28 in the bed portion of the combustion chamber, where it is heated and thereby fully or partially calcinated. From the pipe system 28 the material is conducted via pipe 30 to pipe system 31 in shaft 20. Here the material is cooled by combustion air on its way to the combustion chamber 11. These pipe systems 28 and 31 may be constructed like the transport system described in EP 0 108 505. An auxiliary combustion chamber 32 may be inserted in pipe 31, in which additional heat can be supplied to the absorbent material if the supply of heat in the pipe system 28 is insufficient to achieve calcination. Thanks to the heat supplied and a longer duration of stay in the calcination equipment, the degree of calcination increases. Fuel 34 from container 35 is supplied to the combustion chamber 32 via cell feeder 33. From the cooler 31 the calcinated absorbent is carried to the collection container 36 via pipe 37. The transport air is removed through dust filter 38. Calcinated absorbent material 40 and coal 41, or a mixture of coal and the coarse absorbent fraction, is supplied to the mixer 43 from container 36 or container 42, respectively, via cell feeder 44 or 45, respectively, and thence via pipe 46 to nozzles 47 in the combustion chamber 11. Transport gas is obtained from the compressor 48.

I claim:

1. A method for improving utilization of sulphur-absorbent containing calcium, in a power plant burning fuel in a fluidized bed (12) of particulate material in a combustion chamber (11), characterized in that when fresh absorbent is prepared it is crushed, the crushed material being divided into a fine and a coarse fraction, the coarse fraction being supplied to the bed and the fine fraction being calcinated and used as drying agent for crushed coal (41) and being introduced into the bed together with the fuel.

2. A method as claimed in claim 1, characterized in that the calcination is performed in equipment arranged in the combustion chamber (11).

3. A method as claimed in claim 2, characterized in that the fine fraction of crushed material is transported pneumatically through the calcination equipment (28).

4. A method as claimed in claim 2, characterized in that the calcination equipment (28) consists of a bundle of tubes in the bed (12).

5. A method as claimed in claim 4, characterized in that the bundle of tubes (28) consists of a plurality of parallel tubes which are connected in series.

6. A method as claimed in claim 4, characterized in that material calcinated in the calcination equipment (28) is cooled by combustion air in cooling equipment (31), said combustion air thus being pre-heated.

7. A method as claimed in claim 1, characterized in that the sulphur-absorbent is divided by screening into a fine fraction having a particle size of less than about 0.5 mm and a coarse fraction having a particle size larger than about 0.5 mm.

8. The method of claim 1 wherein said absorbent comprises limestone.

9. The method of claim 1 wherein said absorbent comprises dolomite.

10. The method of claim 1 wherein said coarse fraction is mixed with coal and then the mixture of coarse fraction and coal is mixed with the fine fraction for introduction into the bed.

11. The method of claim 1 wherein said coarse fraction is supplied directly to said bed.

12. A power plant having a combustion chamber for burning fuel in a fluidized bed (12) of a particulate material containing a sulphur-absorbent containing calcium, characterized in that said power plant includes equipment (28) comprising means for dividing said absorbent into a fine and a coarse fraction and means for calcinating the fine absorbent fraction, equipment for mixing calcinated absorbent (40) with crushed coal (41) and equipment, (46, 48) for feeding the mixture of absorbent and coal into the bed.

13. A power plant as claimed in claim 12, characterized in that the calcination equipment (28) is located in the combustion chamber (11).

14. A power plant as claimed in claim 13, characterized in that the calcination equipment comprises a coiled tube (28) located in the combustion chamber (11).

15. A power plant as claimed in claim 14, characterized in that the coiled tube (28) comprises a plurality of parallel tubes connected in series.

16. A power plant as claimed in claim 14, characterized in that an auxiliary combustion chamber (32) is provided downstream of the calcination equipment (28) in the combustion chamber (11), said auxiliary chamber providing extra combustion to ensure a sufficient supply of heat for the desired degree of calcination.

* * * * *